United States Patent
Min

(10) Patent No.: US 11,895,611 B2
(45) Date of Patent: Feb. 6, 2024

(54) SIM CARD REGISTRATION METHOD AND APPARATUS, COMPUTER DEVICE, AND STORAGE MEDIUM

(71) Applicant: ONEPLUS TECHNOLOGY (SHENZHEN) CO., LTD., Guangdong (CN)

(72) Inventor: Zeke Min, Guangdong (CN)

(73) Assignee: ONEPLUS TECHNOLOGY (SHENZHEN) CO., LTD., Shenzhen Guangdong (CN)

( * ) Notice: Subject to any disclaimer, the term of this patent is extended or adjusted under 35 U.S.C. 154(b) by 372 days.

(21) Appl. No.: 17/357,557

(22) Filed: Jun. 24, 2021

(65) Prior Publication Data

US 2021/0321358 A1    Oct. 14, 2021

Related U.S. Application Data

(63) Continuation of application No. PCT/CN2019/127886, filed on Dec. 24, 2019.

(30) Foreign Application Priority Data

Dec. 24, 2018    (CN) .......................... 201811580658.9

(51) Int. Cl.
*H04W 60/04* (2009.01)
*H04W 8/18* (2009.01)

(52) U.S. Cl.
CPC ............ *H04W 60/04* (2013.01); *H04W 8/18* (2013.01)

(58) Field of Classification Search
CPC ............................... H04W 60/04; H04W 8/18

USPC ...................................................... 455/435.1
See application file for complete search history.

(56) References Cited

U.S. PATENT DOCUMENTS

| | | | | |
|---|---|---|---|---|
| 2011/0103277 | A1* | 5/2011 | Watfa ............... | H04W 36/0033 |
| | | | | 370/310 |
| 2011/0230188 | A1 | 9/2011 | Gemski | |
| 2015/0282060 | A1 | 10/2015 | Huang-Fu et al. | |
| 2016/0050556 | A1* | 2/2016 | Zhao ...................... | H04W 8/20 |
| | | | | 455/432.1 |

FOREIGN PATENT DOCUMENTS

| | | |
|---|---|---|
| CN | 1832615 A | 9/2006 |
| CN | 101699902 A | 4/2010 |
| CN | 101699902 A | 4/2010 |
| CN | 102083057 A | 6/2011 |

(Continued)

OTHER PUBLICATIONS

Search Report with an English translation dated Mar. 12, 2020 for Application No. PCT/CN2019/127886.

(Continued)

*Primary Examiner* — Joel Ajayi
(74) *Attorney, Agent, or Firm* — Hodgson Russ LLP

(57) ABSTRACT

A SIM card registration method and apparatus, a computer device, and a storage medium are provided. The method includes: receiving a SIM card registration request, and acquiring a SIM card type corresponding to the SIM card registration request; receiving a feedback information returned according to the SIM card registration request; and responding to the feedback information according to the SIM card type when the feedback information carries preset information.

14 Claims, 5 Drawing Sheets

(56) References Cited

FOREIGN PATENT DOCUMENTS

| | | | |
|---|---|---|---|
| CN | 102461277 | A | 5/2012 |
| CN | 105848134 | A | 8/2016 |
| CN | 106131816 | A | 11/2016 |
| CN | 106131816 | A | 11/2016 |
| CN | 107438243 | A | 12/2017 |
| CN | 108235406 | A | 6/2018 |
| CN | 108696860 | A | 10/2018 |
| CN | 109769243 | A | 5/2019 |
| EP | 2077055 | B1 | 8/2017 |
| WO | 2008041085 | A2 | 4/2008 |

OTHER PUBLICATIONS

Espacenet English abstract of CN 109769243 A.
Espacenet English abstract of CN 101699902 A.
Espacenet English abstract of CN 106131816 A.
Espacenet English abstract of CN 102083057 A.
Espacenet English abstract of CN 108696860 A.
Espacenet English abstract of CN 107438243 A.
Espacenet English abstract of CN 102461277 A.
Espacenet English abstract of CN 1832615 A.
Espacenet English abstract of CN 108235406 A.
3GPP Technical Specification Group Services and System Aspects; General Packet Radio Service (GPRS) Enhancements for Evolve Universal Terrestrial Radio Access Network (E-UTRAN) access (Release 16), 3GPP TS 23.401, vol. SA WG2, No. V16.1.0, Dec. 18, 2018.
3GPP Technical Specification Group Core Network and Terminals; Non-Access-Stratum (NAS) protocol for Evolved Packet System (EPS); Stage 3 (Release 15), 3GPP TS 24.301, vol. CT WG1, No. V15.5.0, Dec. 21, 2018.
3GPP Technical Specification Group Services and System Aspects; Circuit Switched (CS) Fallback in Evolved Packet System (EPS); Stage 2 (Release 15), 3GPP TS 23.272, vol. SA WG2, No. V15.0.0, Dec. 22, 2017.
EPO, Extended European Search Report, EP Appl. No. 19903902.5, dated Aug. 25, 2022.
IPI, First Examination Report issued in IN Application No. 202117029279, dated Mar. 23, 2022.

* cited by examiner

SIM CARD REGISTRATION METHOD AND APPARATUS, COMPUTER DEVICE, AND STORAGE MEDIUM

CROSS REFERENCE TO RELATED APPLICATIONS

This application is a continuation of International Application No. PCT/CN2019/127886, filed on Dec. 24, 2019, which is based on and claims priority of the Chinese patent application No. 201811580658.9 filed on Dec. 24, 2018, with a title of "SIM CARD REGISTRATION METHOD AND APPARATUS, COMPUTER DEVICE, AND STORAGE MEDIUM".

TECHNICAL FIELD

This application relates to the field of communication technology, and in particular to a SIM card registration method, apparatus, computer device, and storage medium.

BACKGROUND

With the development of the communication technology industry, SIM cards that do not provide CS services have appeared. In the prior art, when a SIM card registration is initiated by a user, a SIM card registration request is sent to the network, and a feedback information returned by the network according to the SIM card registration request is received. A terminal responds to the feedback information to complete the registration. Where, some networks also carry a cause value that the CS domain is unavailable while returning the feedback information. At this time, according to the standard protocol, the 4G capability of the SIM card needs to be turned off, which will cause the SIM card that does not provide the CS service to be unable to register with the data network service, which affects normal Internet access.

SUMMARY

This application provides a SIM card registration method, apparatus, computer device, and storage medium.

A SIM card registration method including:
receiving a SIM card registration request, and acquiring a SIM card type corresponding to the SIM card registration request;
receiving a feedback information returned according to the SIM card registration request;
responding to the feedback information according to the SIM card type when preset information is carried in the feedback in formation.

A SIM card registration apparatus, the apparatus including:
a SIM card type acquisition module, configured to receive a SIM card registration request, and acquire the SIM card type corresponding to the SIM card registration request;
a return information reception module, configured to receive a feedback information returned according to the SIM card registration request;
a response module, which is configured to respond to the feedback information according to the SIM card type when a preset information is carried in the feedback information.

A computer device, including a processor and a memory storing computer-readable instructions that, when executed by the processor, cause the processor to implement the steps of the above-mentioned method.

A non-volatile computer-readable storage medium storing computer-readable instructions which, when executed by a processor, implement the steps of the above-mentioned method.

In the above-mentioned SIM card registration method, apparatus, computer device and storage medium, when a SIM card registration request is received, a SIM card type of the SIM card corresponding to the SIM card registration request is acquired; a feedback information returned according to the SIM card registration request is received; and when a preset information is carried in the feedback information, a response operation to the feedback information is determined according to the type of the SIM card.

DETAILED DESCRIPTION

In order to make the technical solutions of this application clearer, the following further describes this application in detail with reference to the accompanying drawings and embodiments. It should be understood that the specific embodiments described herein are only used to explain the application, and not used to limit, the application.

Figure 1:
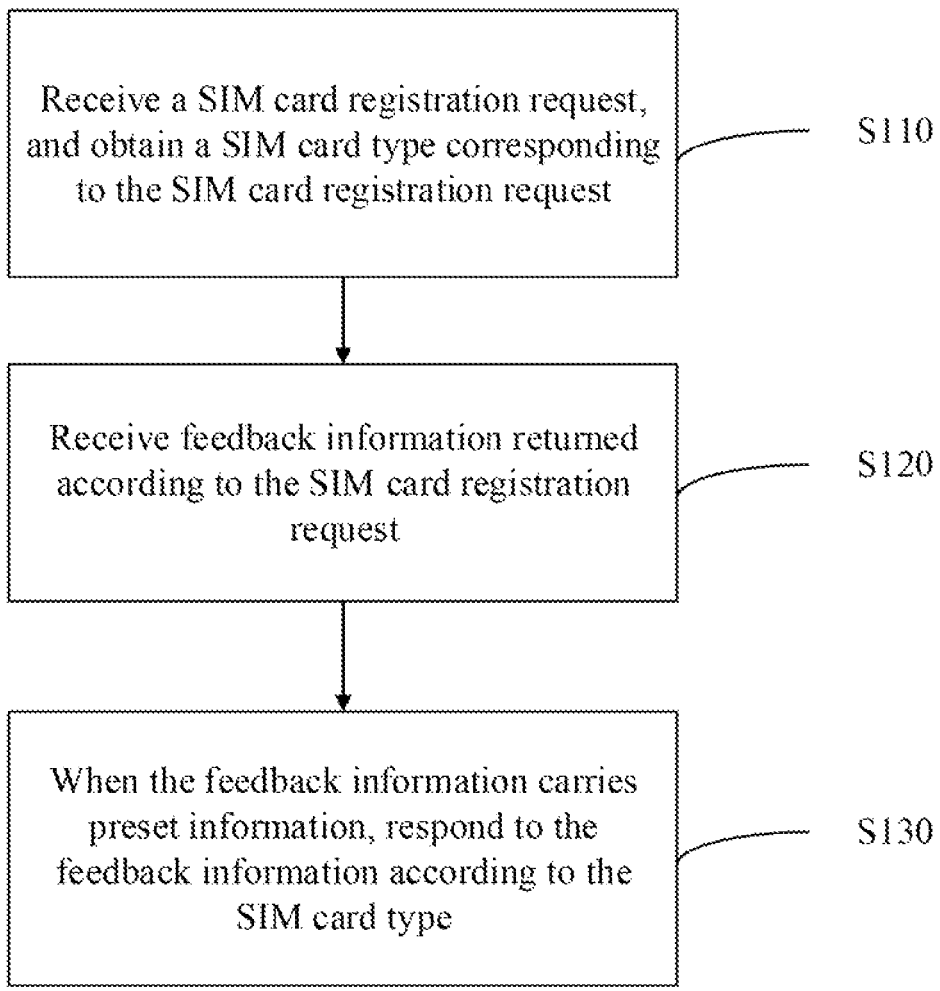
FIG. 1 is a schematic flowchart of a SIM card registration method in an embodiment.

In an embodiment, of the present application, as shown in FIG. 1, a SIM card registration method is provided, which includes the following steps S110 to S130.

At step S110, a SIM card registration request is received, and a SIM card type corresponding to the SIM card registration request is acquired.

A new SIM card needs to be registered before a user uses it. Where, the SIM card registration request is a request initiated to the operator's network when the SIM card is registered by the user.

In one embodiment, the SIM card type includes: a physical card and a virtual card. Where virtual cards, also called traffic cards, are only used to provide network data services. The virtual cards cannot provide CS service, such as eSIM cards (Embedded-SIM). The concept of the eSIM card is to embed die traditional SIM card directly on the device chip instead of adding it to the device as an independent removable component. The user does not need to insert a physical SIM card; the physical card corresponding, to the virtual card is a traditional SIM card, and the physical card can provide CS services.

In this embodiment, when the user registers the SIM card, a SIM card registration request is sent to the operator network. When the terminal receives the SIM card registration request, it acquires the SIM card type corresponding to the SIM card registration request according to the SIM card registration request.

Further, in one embodiment, the SIM card registration request of the virtual card can be actively triggered by the user using software, and the SIM card registration request of the physical card can usually be automatically initiated when the user inserts the card into the card slot of the terminal. It can be understood that, in other embodiments, the physical SIM card and the virtual SIM card can also initiate a SIM card registration request in other ways, and it is only needed to determine that the terminal can distinguish the SIM card type of the corresponding SIM card according to the SIM card registration request. Therefore, furthermore, when the terminal receives the SIM card registration request, it can acquire the SIM card type of the corresponding SIM card according to the manner in which the SIM card registration request is initiated, thereby realizing the SIM type corresponding to the SIM card registration request. In one embodiment, determining the SIM card type corresponding to the SIM card registration request according to the SIM card registration request including: determining that the SIM card type corresponding to the SIM card registration request is the virtual card when the SIM card registration request is actively triggered by software. Further, the terminal can set a corresponding SIM card type identifier according to the SIM card type of the SIM card.

At step S120, a feedback information returned according to the SIM card registration request is received.

Where the user sends a SIM card registration request to the operator network through the terminal, and the operator network returns feedback information according to the SIM card registration request.

At step S130, a response to the feedback information is made according to the SIM card type when a preset information is carried in the feedback information.

Further, after receiving the feedback information returned by the operator network according to the SIM registration request, the terminal responds to the feedback information according, to the protocol. In this embodiment, when the received feedback information contains a preset information, a response to the feedback information is made according to the SIM card type corresponding to the SIM card registration request.

Where the feedback information returned by some operator networks will carry a preset information. In one embodiment, the preset information is a cause value that a CS domain is unavailable. Where, the CS domain represents a Circuit Switching Domain, which is a switching manner where a circuit connection between the sender and receiver and is established and maintained until the end of the communication. Therefore, circuit switching must establish a physical path between the two communicating parties, which is exclusively occupied by both parties, before communicating. In one embodiment, the cause value that the CS domain is unavailable is cause #18. In a specific embodiment, taking the registration type of the SIM card as combined attach as an example, some networks will reply EPS only attach (feedback information), and carry the cause value that the CS domain is unavailable (CS domain not available) (preset information). Therefore, in this embodiment, when the terminal receives the feedback information carrying the cause value that the CS domain is unavailable, it responds to the feedback information according to the SIM card type. Further, the terminal makes different response operations to the received feedback information according to whether the SIM card is a physical card or a virtual card.

Further, in one embodiment, responding by the terminal to the feedback information according to the SIM card type, includes: reserving data capability when the SIM card type is a virtual card. Or, in another embodiment, responding by the terminal to the feedback information according to the SIM card type, includes: responding to the feedback information according to a standard protocol when the SIM card type is a physical card.

In this embodiment, when the feedback information carries a preset information, responding by the terminal to the feedback information specifically includes reserving the data capability of the virtual SIM card if the SIM card type corresponding to the SIM card registration request is a virtual card. Where, reserving the data capability of the virtual SIM card indicates not turning off the data capability of the SIM card. In another embodiment, further, the terminal may allow the virtual SIM card to try to register with other network service cells. In one embodiment, the data capability of the SIM card may include 4G capability, 5G capability of the SIM, etc. In this embodiment, reserving the data capability of the virtual SIM card refers to reserving the 4G capability of the virtual SIM card.

In another embodiment, if the SIM card type corresponding to the SIM card registration request is a physical card, the response operation of the terminal to the feedback information is specifically to respond to the feedback information according to a standard protocol. In one embodiment, responding to the feedback information according to the standard protocol is to process according to the requirements of the spec.

Further, responding to the feedback information according to the standard protocol includes: turning off the data capability. That is, in this embodiment, when the feedback information received by the terminal carries preset information, the data capability of the SIM card will be turned off according to the standard protocol if the SIM card is a physical card.

In the above SIM card registration method, after the user sends a SIM card registration request to the operator network through the terminal, the operator network returns feedback information according to the SIM card registration request, and the terminal responds to the feedback information. In some cases, the feedback information returned by the operator network further carries a preset information. At this time, according to the standard protocol, the terminal needs to turn off the data capability of the SIM card. In the embodiment of this application, when the terminal receives the SIM card registration request, it acquires the SIM card type corresponding to the SIM card registration request through an analysis of the SIM card registration request. Therefore, when the terminal receives the feedback information with a preset information returned by the operator network, it can determine the response operation to the feedback information according to the type oldie SIM card.

Further, if it is determined according to the SIM card type that the SIM card corresponding to the SIM card registration request is a virtual card, a response operation of the terminal to the feedback information is to reserve the data capability of the virtual SIM card. If it is determined according to the SIM card type that the SIM card corresponding to the SIM card registration request is a physical card, a response operation of the terminal to the feedback information is to turn off the data capability of the physical SIM card according to the standard protocol.

In the above-mentioned SIM card registration method, when a SIM card registration request is received, a SIM card type of the SIM card corresponding to the SIM card registration request is acquired; a feedback information returned according to the SIM card registration request is received; and when a preset information is carried in the feedback information, a response operation to the feedback information is determined according to the type of the SIM card.

Figure 2:
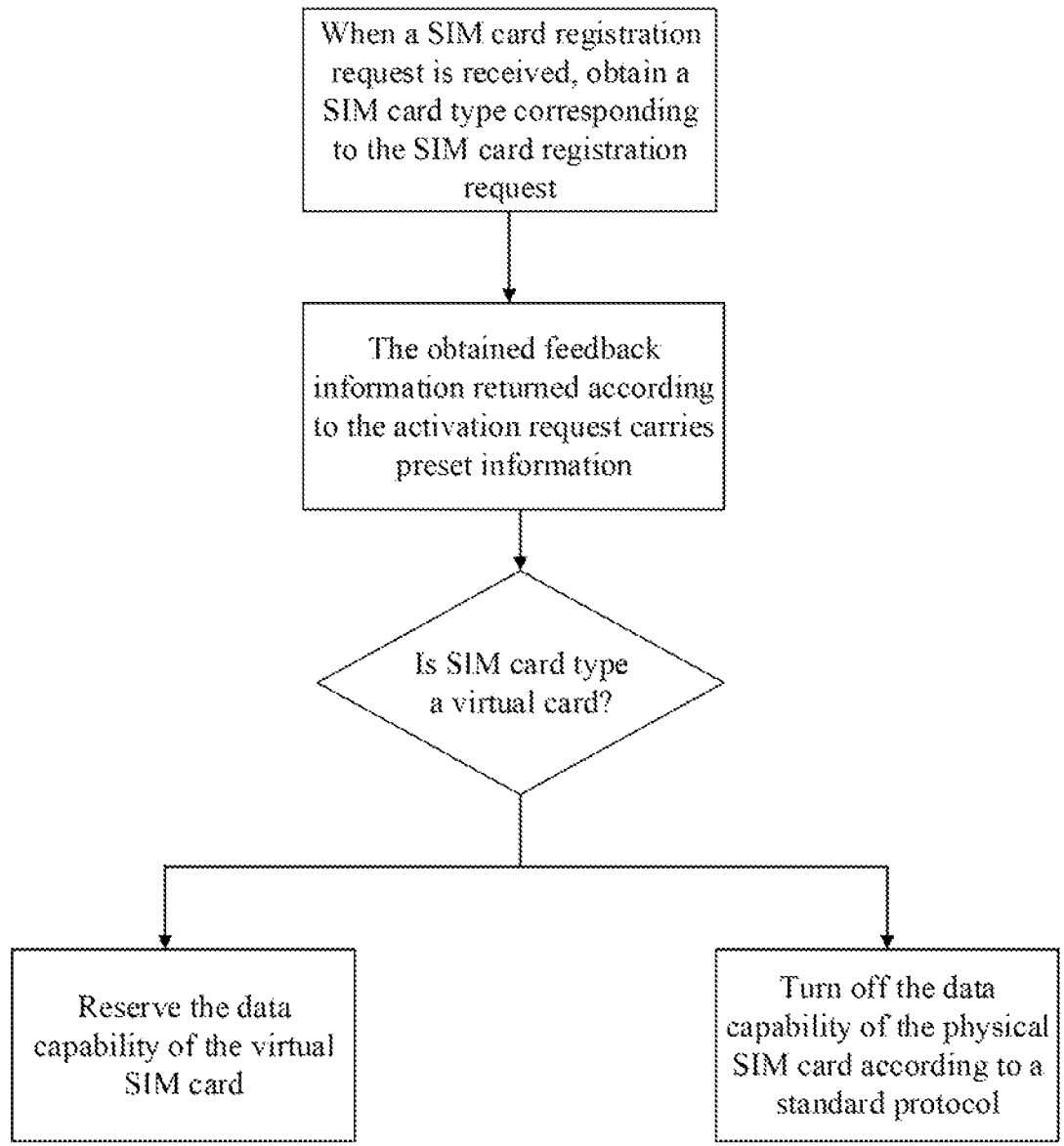
FIG. 2 is a schematic flowchart of a SIM card registration method in a specific embodiment.

In a specific embodiment, as shown in FIG. 2, taking the data capability as 4G capability and the registration type of the SIM card as combined attach as an example, the above SIM card registration method includes the steps of: when the SIM card registration request is received, acquiring by the terminal the SIM card type corresponding to the SIM card registration request according to the SIM card registration request. In one embodiment, if it is detected that the SIM card registration request is actively triggered by the software, it is determined that the SIM card type of the SIM card is a virtual card.

The terminal receives the feedback information returned by the operator according to the SIM card registration request. In one embodiment, the feedback information returned by the operator network according to the SIM card registration request is EPS only attach.

When the received feedback information carries a preset information, the terminal responds to the feedback information according to the SIM card type. Where in one embodiment, the preset information carried in the feedback information is the cause value that the CS domain is unavailable. At this time, the terminal determines the response operation to the feedback information according to the SIM card type: if the SIM card type is a virtual card, the 4G capability of the SIM card is reserved, and if the SIM card type is a physical card, the 4G capability of the SIM card is turned off according to the standard protocol.

Figure 3:
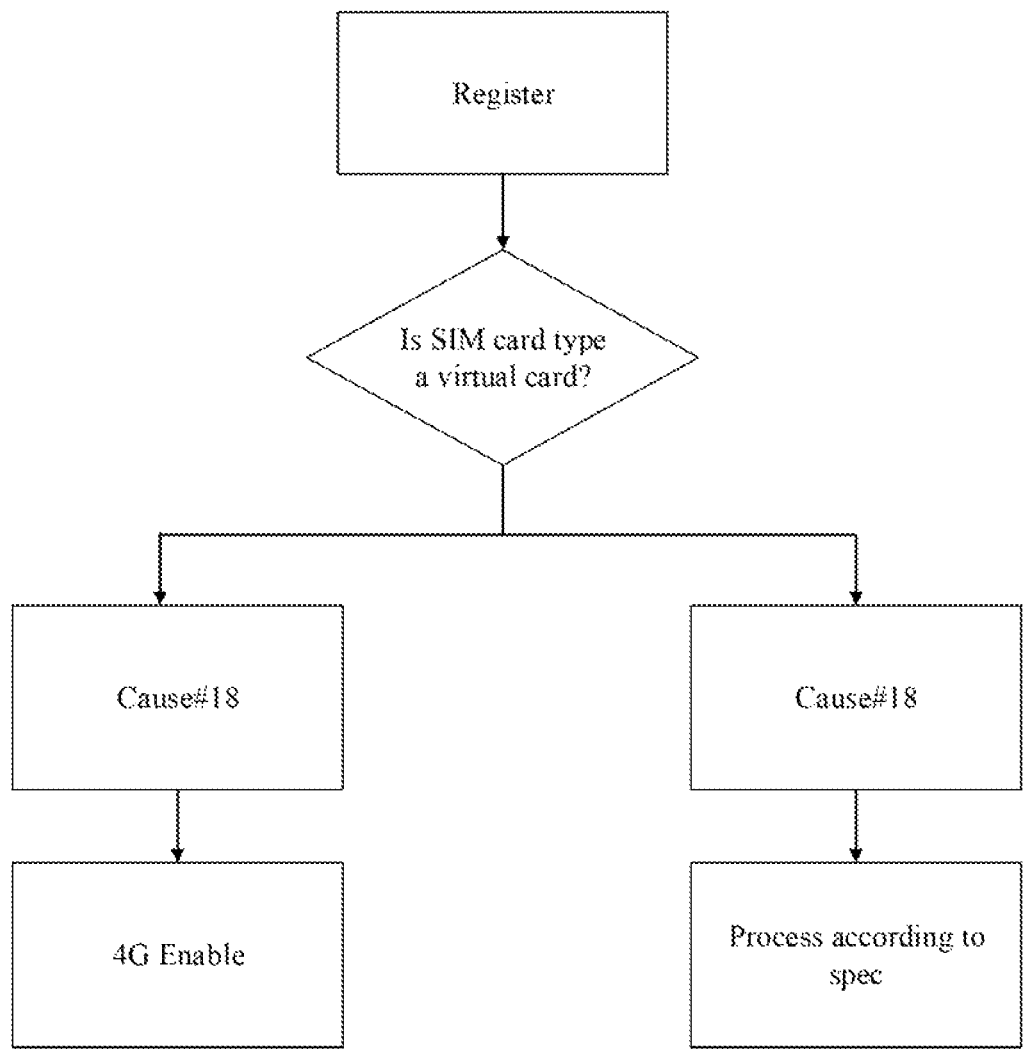
FIG. 3 is a schematic flowchart of a SIM card registration method in another specific embodiment.

In another embodiment, taking the standard protocol as the spec protocol as an example, the flow of the SIM card registration method is shown in FIG. 3.

It should be understood that although the various steps in the flowcharts of FIGS. 1 to 3 are shown in sequence as indicated by the arrows, these steps are not necessarily executed in sequence in the order indicated by the arrows. Unless explicitly stated in this text, there is no strict order for the execution of these steps, and these steps can be executed in other sequences. Moreover, at least part of the steps in FIGS. 1 to 3 may include multiple sub-steps or multiple stages. These sub-steps or stages are not necessarily executed at the same time, and can be executed at different times. The order of execution of these sub-steps or stages is not necessarily performed sequentially, and may be performed alternately or alternately with other steps or at least a part of the sub-steps or stages of other steps.

Figure 4:
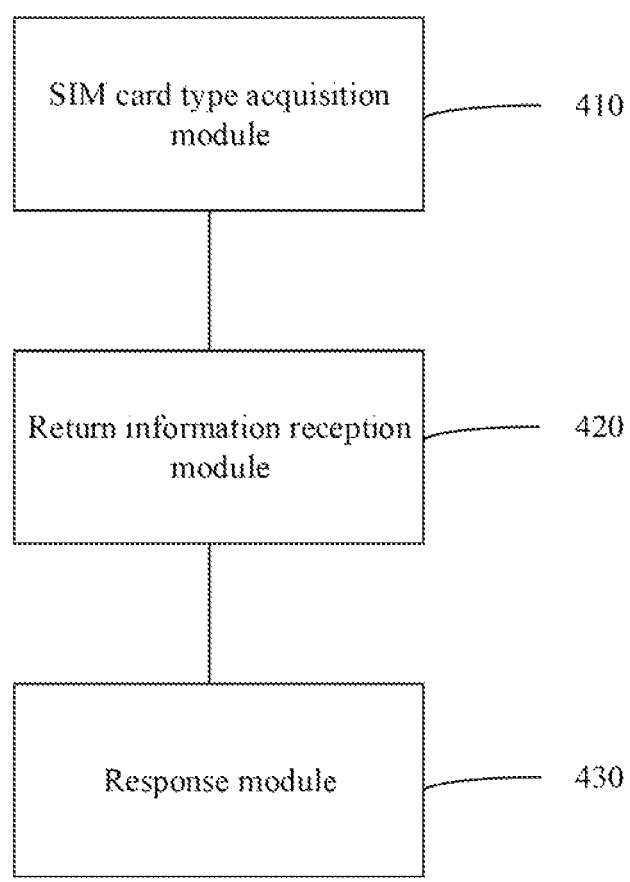
FIG. 4 is a structural block diagram of a SIM card registration apparatus in an embodiment.

In one embodiment, as shown in FIG. 4, a SIM card registration apparatus is provided, including: SIM card type acquisition module 410, return information reception module 420, response module 430.

The SIM card type acquisition module 410 is configured to receive a SIM card registration request, and acquire the SIM card type corresponding to the SIM card registration request.

The return information reception module 420 is configured to receive a feedback information returned according to the SIM card registration request.

The response module 430 is configured to respond to the feedback information according to the SIM card type when a preset information is carried in the feedback information.

In one embodiment, the SIM card type includes a physical card and a virtual card.

In one embodiment, the response module 430 is configured to reserve data capability when the SIM card type is a virtual card; or, the response module 430 is configured to respond to the feedback information according to a standard protocol when the SIM card type is a physical card.

Regarding the specific limitation of the SIM card registration apparatus, please refer to the above limitation of the SIM card registration method, which will not be repeated here. Each module in the above SIM card registration apparatus can be implemented in whole or in part by software, hardware, and a combination thereof. The above-mentioned modules may be embedded in the form of hardware or independent of the processor in the computer device, or may be stored in the memory of the computer device in the form of software, so that the processor can call and execute the corresponding operations of the above-mentioned modules.

Figure 5:
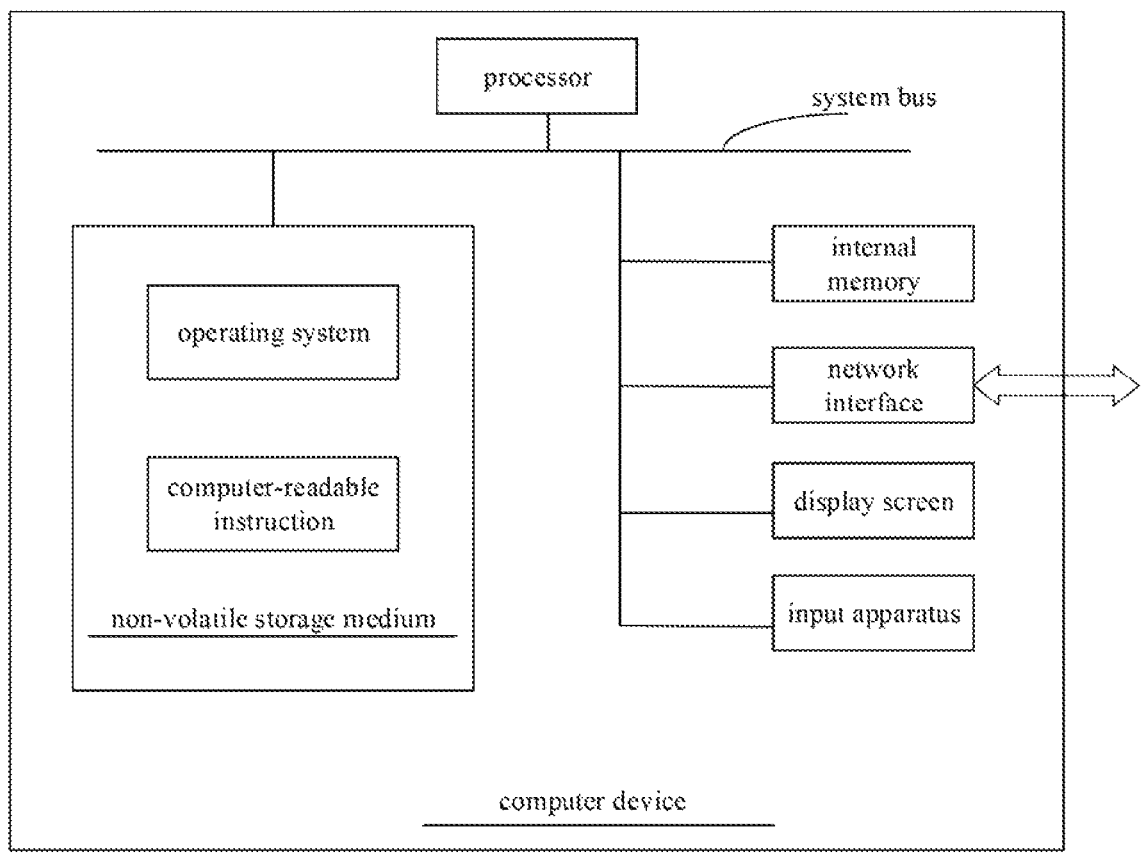
FIG. 5 is an internal structure diagram of a computer device in an embodiment.

In one embodiment, a computer device is provided. The computer device may be a terminal, and its internal structure diagram may be as shown in FIG. 5. The computer device includes a processor, a memory, a network interface, a display screen, and an input apparatus connected through a system bus. Where the processor of the computer device is used to provide calculation and control capabilities. The memory of the computer device includes a non-volatile storage medium and an internal memory. The non-volatile storage medium stores an operating system and computer-readable instructions. The internal memory provides an environment for the operation of the operating system and computer-readable instructions in the non-volatile storage medium. The network interface of the computer device is used to communicate with an external terminal through a network connection. The computer-readable instruction is executed by the processor to realize at SIM card registration method. The display screen of the computer device can be a liquid crystal display screen or an electronic ink display screen. The input apparatus of the computer device can be a touch layer covered on the display screen, or it can be a button, a trackball or a touchpad set on the housing of the computer device, and it can also be an external keyboard, touchpad, or mouse.

Those skilled in the art can understand that the structure shown in FIG. 5 is only a block diagram of a part of the structure related to the solution of the present application, and does not constitute a limitation on the computer device to which the solution of the present application is applied. The specific computer device may include more or fewer components than shown in the figure, or combine certain components, or have a different component arrangement.

In one embodiment, a computer device is provided, which includes processor a memory storing computer-readable instructions that, when executed by the processor, cause the processor to implement the following steps:

receiving a SIM card registration request, and acquiring, a SIM card type corresponding to the SIM card registration request;

receiving a feedback information returned according to the SIM card registration request;

responding to the feedback information according to the SIM card type when a preset information is earned in the feedback information.

In one embodiment, the processor also implements the following step when executing computer-readable instructions: the SIM card type includes a physical card and a virtual card.

In one embodiment, the processor also implements the following step when executing computer-readable instructions: it is determined that the SIM card type corresponding to the SIM card registration request is a virtual card when the SIM card registration request is actively triggered by software.

In one embodiment, the processor also implements the following step when executing computer-readable instructions: the preset information is a cause value that the CS domain is unavailable.

In one embodiment, the processor also implements the following step when executing computer-readable instructions: responding to the feedback information according to the SIM card type includes: reserving data capability when the SIM card type is a virtual card.

In one embodiment, the processor also implements the following step when executing computer-readable instructions: responding to the feedback information according to the SIM card type includes: responding to the feedback information according to a standard protocol when the SIM card type is a physical card.

In one embodiment, a non-volatile computer-readable storage medium storing computer-readable instructions is provided, the computer-readable instructions, when executed by the processor, implement the following steps of:

receiving, a SIM card registration request, and acquiring a SIM card type corresponding to the SIM card registration request;

receiving a feedback information returned according to the SIM card registration request;

responding to the feedback information according to the SIM card type when a preset information is carried in the feedback information.

In one embodiment, when the computer-readable instructions are executed by the processor, the following steps are further implemented: the SIM card type includes a physical card and a virtual card.

In one embodiment, when the computer-readable instructions are executed by the processor, the following steps are further implemented: it is determined that the SIM card type corresponding to the SIM card registration request is the virtual card when the SIM card registration request is actively triggered by software.

In one embodiment, when the computer-readable instructions are executed by the processor, the following steps are further implemented: the preset information is the cause value that the CS domain is unavailable.

In one embodiment, when the computer-readable instructions are executed by the processor, the following steps are further implemented: responding to the feedback information according to the SIM card type, includes: reserving data capability when the SIM card type is a virtual card.

In one embodiment, when the computer-readable instructions are executed b the processor, the following steps are further implemented: responding to the feedback information according to the SIM card type, includes: responding to the feedback information according to a standard protocol when the SIM card type is a physical card.

In the above-mentioned SIM card registration apparatus, computer device and storage medium, when a SIM card registration request is received, a SIM card type of the SIM card corresponding to the SIM card registration request is acquired; a feedback information returned according to the SIM card registration request is received; and when a preset information is carried in the feedback information, a response operation to the feedback information is determined according to the type of the SIM card.

Those skilled in the art can understand that all or part of the processes in the methods of the foregoing embodiments can be implemented by instructing relevant hardware through computer-readable instructions. The computer-readable instructions can be stored in a non-volatile computer-readable storage medium. When the computer-readable instructions are executed, they may include the processes of the above-mentioned method embodiments. Herein, any reference to memory, storage, database or other media used in the embodiments provided in this application may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration but not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

The technical features of the above embodiments can be combined arbitrarily, in order to make the description concise, all possible combinations of the technical features in the above embodiments are not described. However, as long as there is no contradiction in the combination of these technical features, they should be regarded as the scope of this specification.

The above-mentioned embodiments only describe several implementation manners of the present application, and their descriptions are relatively specific and detailed, but they should not be understood as a limitation on the scope of the invention patent. It should be pointed out that for those skilled in the art, without departing from the concept of this application, several modifications and improvements can be made, and these all fall within the scope of protection of this application. Therefore, the scope of protection of the patent in this application shall be subject to the appended claims.

The invention claimed is:

1. A Subscriber Identity Module (SIM) card registration method, performed by a terminal, comprising:
receiving a SIM card registration request;
acquiring a SIM card type corresponding to the SIM card registration requests wherein the SIM card type is a virtual card;
sending the SIM card registration request to an operator network;
receiving a feedback information, carrying preset information, returned according to the SIM card registration request from the operator network, wherein the feedback information according to the SIM card type comprises the virtual card being a card unable to provide Circuit Switching (CS) service;
determining that the preset information is a cause value that a CS domain is unavailable;
responding to the feedback information based upon the determination that the preset information is the cause value comprises reserving data capability on the virtual card for Internet access.

2. The method of claim 1, wherein the SIM card type comprises a physical card and the virtual card.

3. The method of claim 1, wherein it is determined that the SIM card type corresponding to the SIM card registration request is the virtual card when the SIM card registration request is actively triggered by software.

4. The method of claim 1, wherein responding to the feedback information according to the SIM card type comprises:

responding to the feedback information according to a standard protocol when the SIM card type is the physical card.

5. A terminal, comprising:
a processor and a memory storing computer-readable instructions that, when executed by the processor, cause the processor to implement following steps of:
receiving a Subscriber Identity Module (SIM) card registration request, acquiring a SIM card type corresponding to the SIM card registration request, wherein the SIM card type is a virtual card;
sending the SIM card registration request to an operator network;
receiving a feedback information, carrying preset information, returned according to the SIM card registration request from the operator network, wherein the feedback information according to the SIM card type comprises the virtual card being a card unable to provide Circuit Switching (CS) service;
determining that the preset information is a cause value that a CS domain is unavailable;
responding to the feedback information based upon the determination that the preset information is the cause value comprises reserving data capability on the virtual card for Internet access.

6. The terminal of claim 5, wherein the SIM card type comprises a physical card and the virtual card.

7. The terminal of claim 5, wherein it is determined that the SIM card type corresponding to the SIM card registration request is the virtual card when the SIM card registration request is actively triggered by software.

8. The terminal of claim 5, wherein responding to the feedback information according to the SIM card type, comprises:
responding to the feedback information according to a standard protocol when the SIM card type is a physical card.

9. A non-transitory computer-readable storage medium storing computer-readable instructions which, when executed by a processor in a terminal, implement steps, comprising:
receiving a Subscriber Identity Module (SIM) card registration request, acquiring a SIM card type corresponding to the SIM card registration request, wherein the SIM card type is a virtual card;
sending the SIM card registration request to an operator network;
receiving a feedback information, carrying preset information, returned according to the SIM card registration request from the operator network, wherein the feedback information according to the SIM card type comprises the virtual card being a card unable to provide Circuit Switching (CS) service;
determining that the preset information is a cause value that a CS domain is unavailable;
responding to the feedback information based upon the determination that the preset information is the cause value comprises reserving data capability on the virtual card for Internet access.

10. The non-transitory computer-readable storage medium of claim 9, wherein the SIM card type comprises a physical card and the virtual card.

11. The non-transitory computer-readable storage medium of claim 9, wherein it is determined that the SIM card type corresponding to the SIM card registration request is the virtual card when the SIM card registration request is actively triggered by software.

12. The non-transitory computer-readable storage medium of claim 9, wherein responding to the feedback information according to the SIM card type, comprises:
responding to the feedback information according to a standard protocol when the SIM card type is a physical card.

13. The method of claim 1, wherein the SIM card registration request is a request initiated by a user to an operator's network in response to registering the SIM card.

14. The method of claim 1, wherein the data capability of the virtual SIM card comprises 4G capability or 5G capability of the SIM card.

* * * * *